UNITED STATES PATENT OFFICE.

CHARLES W. BULLOCK, OF BUFFALO, NEW YORK, ASSIGNOR, BY MESNE ASSIGNMENTS, TO FAIRSIMO GLUE COMPANY, INC., OF BUFFALO, NEW YORK, A CORPORATION OF NEW YORK.

WATERPROOF COMPOSITION.

1,127,181.     Specification of Letters Patent.     Patented Feb. 2, 1915.

No Drawing.     Application filed March 24, 1911. Serial No. 616,575.

*To all whom it may concern:*

Be it known that I, CHARLES W. BULLOCK, a citizen of the United States, residing at Buffalo, in the county of Erie and State of New York, have invented a new and useful Improvement in Waterproof Compositions, of which the following is a specification.

This invention relates to a waterproof composition and the method of making the same. The composition is especially suitable for treating paper and paper board to render them impervious to water and other liquids and moisture, but it is not restricted in its usefulness to this particular purpose as it is also suited for waterproofing other materials, such, for instance, as leather, wood and closely woven textile fabrics.

The objects of the invention are to produce an economical, efficient and practical composition for treating materials to render them impervious to water and other liquids and moisture; and also to produce a waterproofing composition such that paper treated therewith will be tough but flexible or pliable, will not be discolored, and will have a surface adapted for printing purposes and to be pasted or cemented so that it can be manufactured into bags and other receptacles or articles having pasted parts.

A waterproof composition especially suitable for rendering paper and paper board impervious to water and moisture is produced by combining the following ingredients in approximately the proportions named, to-wit: glue, 75 ounces; zinc oxid, 4 ounces; chromic oxid, 6 ounces; glycerin, 100 fluid ounces; lead carbonate, 12 ounces; and sufficient water to make 30 gallons of the composition or solution.

This composition is prepared in the following manner: The glue is dissolved in 15 gallons (more or less) of water, after which the zinc oxid is added and the mixture heated, preferably in a water bath, for about ten minutes. The chromic oxid and 5 gallons (more or less) of water are then added and the whole mixture is boiled for about five minutes. Then the glycerin and 5 gallons (more or less) of water are added and the mixture boiled for about five minutes, after which the lead carbonate and 5 gallons of water (more or less) are added and the mixture is stirred thoroughly. Apparently a small quantity of lead oxid is formed in the mixture but the bulk of the lead carbonate and chromic oxid remain unaltered. The precipitate is preferably allowed to settle and the clear solution is drawn off, but this is not absolutely necessary, since the precipitate may be left in the composition if desired. The invention is not, however, restricted to the use of all of the ingredients named nor to the above mentioned proportions, since for some purposes the proportions of the ingredients can be materially changed or one or more of the ingredients omitted. For example, the zinc oxid is used as a bleaching agent for the glue and to kill the animal fat therein. If glue is used which is free from fat and is sufficiently light in color, or if it contains zinc oxid, which is the case with some glue, then less zinc oxid is required, and it can even be omitted entirely. If the composition is to be used for waterproofing stiff papers and paper boards which are not required to be flexible or pliable, the quantity of glycerin can be greatly reduced and in some instances dispensed with. The proportions of the ingredients are also varied more or less, depending upon the nature of the material which is to be treated with the composition. For instance, the ingredients can be used in greatly reduced quantities when making the composition for waterproofing thin, porous papers. The proportions of glue and water in the composition can be varied greatly, depending upon what use is to be made of the composition. A more or less satisfactory waterproof composition can also be made by using other suitable gelatinous substances in place of the glue.

The paper or other material to be waterproofed is immersed in or passed through the described composition, being retained therein until it is sufficiently impregnated with the composition, the period of immersion depending upon the nature of the material being treated and the characteristics required in the waterproofed material. A longer time is required to properly impregnate dense paper than thin, porous paper, and if the material is required to be impervious to water only it is not necessary for the composition to so thoroughly penetrate the material or close its pores, and the material need not remain in the composition so long a time as if it be required to make the material impervious to air as well as water. The composition is retained at a temperature of from about 130° to 160° Fahrenheit while treating the material, and sufficient water is added from time to time to replace that lost by evaporation so as to keep a substantially uniform composition.

Paper treated with the described composition is impervious to water and moisture and can be made practically impervious to air, or not, depending upon the treatment, as explained. It is flexible, tough and strong, is not discolored, and the surface will readily take writing and printing ink, and is also suitable for pasting or cementing. The waterproofed paper is therefore eminently suited for the manufacture of bags or receptacles for cement, flour and other substances which must be kept dry.

I claim as my invention:

1. A waterproof composition comprising:—glue, chromic oxid and water, substantially as set forth.

2. A waterproof composition comprising glue, chromic oxid, lead carbonate, and water, substantially as set forth.

3. A waterproof composition comprising glue, zinc oxid, chromic oxid, glycerin, lead carbonate, and water, substantially as set forth.

4. A waterproof composition for paper and other material comprising the following ingredients in approximately the proportions stated, to-wit:—glue, 75 ounces; zinc oxid, 4 ounces; chromic oxid, 6 ounces; glycerin, 100 fluid ounces; lead carbonate, 12 ounces; and sufficient water to make 30 gallons of the composition, substantially as set forth.

5. The herein described method of making a waterproof composition, consisting in dissolving glue in water; then adding zinc oxid and heating the solution; then adding chromic oxid and water and boiling the mixture; then adding glycerin and water and boiling the mixture; and then adding lead carbonate and water, substantially as set forth.

6. The herein described method of making a waterproof composition for paper and other material, consisting in dissolving 75 ounces (more or less) of glue in 15 gallons (more or less) of water; then adding 4 ounces (more or less) of zinc oxid and heating the solution; then adding 6 ounces (more or less) of chromic oxid and 5 gallons (more or less) of water and boiling the mixture; then adding 100 ounces (more or less) of glycerin and 5 gallons (more or less) of water and boiling the mixture; and then adding 12 ounces (more or less) of lead carbonate and 5 gallons (more or less) of water, substantially as set forth.

Witness my hand, this 15th day of March, 1911.

CHARLES W. BULLOCK.

Witnesses:
C. W. PARKER,
A. L. McGEE.